United States Patent [19]
Sekida et al.

[11] 3,868,711
[45] Feb. 25, 1975

[54] PHOTOGRAPHIC CAMERA HAVING A DETACHABLY MOUNTED VIEW FINDER CASING

[75] Inventors: Minoru Sekida; Masaru Ohba, both of Osaka, Japan

[73] Assignee: Minolta Camera Kabushiki Kaisha, Osaka, Japan

[22] Filed: Apr. 30, 1973

[21] Appl. No.: 355,812

[30] Foreign Application Priority Data
May 10, 1972 Japan.................................. 47-53704

[52] U.S. Cl.................................... 354/219, 354/60
[51] Int. Cl. ..................................... G03b 13/00
[58] Field of Search............................ 95/42, 11 V; 354/221-225, 60, 219

[56] References Cited
UNITED STATES PATENTS
| | | | |
|---|---|---|---|
| 3,733,984 | 5/1973 | Yata | 95/42 X |
| 3,757,643 | 9/1973 | Burgarella | 95/11 L |

*Primary Examiner*—Samuel S. Matthews
*Assistant Examiner*—E. M. O'Connor
*Attorney, Agent, or Firm*—Watson, Cole, Grindle & Watson

[57] ABSTRACT

A photographic camera having a view finder casing detachably mounted on a camera body which has an electronic shutter, wherein the view finder casing is provided at least with a light measuring circuit for the electronic shutter and a circuit for connecting the output of the light measuring circuit to a storage means. The camera body is provided with a circuit for connecting the electronic shutter to a power source and with a control circuit for controlling the electronic shutter. The photographic camera further comprises, in either the view finder casing or the camera body, a flexible printed circuit connector which has at one end thereof a bent portion, and the circuit in the other of either the view finder casing or the camera body has a contact member for contacting engagement with the bent portion of the flexible printed circuit connector when the view finder is being mounted in a correct position on the camera body, thereby to supply current from the power source in the camera body to the light measuring circuit in the view finder casing and connect the storage circuit in the view finder casing to a switching circuit in the camera body during exposure.

6 Claims, 6 Drawing Figures

PHOTOGRAPHIC CAMERA HAVING A DETACHABLY MOUNTED VIEW FINDER CASING

BACKGROUND OF THE INVENTION

This invention relates to an electronic shutter type photographic camera having a view finder casing detachably mounted on the camera body, and more particularly to a single lens reflex camera wherein a view finder casing including a pentaprism is detachably mounted on the camera body which has an electronically controlled shutter.

In a single lens reflex camera including an interchangeable objective lens, film transporting mechanism, movable reflecting mirror, lens diaphragm adjusting mechanism, focal plane shutter, shutter releasing mechanism and focus detecting plate, it is known to detachably mount on the camera body a view finder casing which includes a pentagonal prism and an eyepiece.

It is also known, in an electronic shutter type single lens reflex camera, to provide a light receiving element for receiving light rays incoming through the objective lens from the photographing view field. Such light receiving element is located, for example, on the roof or upper surface of the pentagonal prism in such a manner that the element receives at least a portion of the light rays which are incident along the light passage or optical axis of the view finder, for measuring the amount of incident light and memorizing the measured amount in a storage circuit for controlling the exposure by the electronic shutter.

THE OBJECT OF THE INVENTION

It is an object of the present invention to provide a photographic camera of the single lens reflex type with an electronic shutter, wherein component elements of the electronic shutter control circuit including a power source and a light receiving element are separately provided in the view finder casing and on the camera body, and are connected together to constitute a complete electronic control circuit when the view finder casing is mounted correctly in position on the camera body.

It is another object of the present invention to provide a photographic camera of the type mentioned above, wherein component elements of the electronic shutter control circuit are separately mounted in the view finder casing and the camera body in such a manner that the separate elements are connected together to form a complete electronic control circuit when the view finder casing is mounted correctly in position on the camera body, the electronic control circuit elements on the camera body and in the view finder casing being formed into an integrated circuit, respectively.

SUMMARY OF THE INVENTION

With the above objects in view, the present invention provides a photographic camera of the single lens reflex type having an electronically controlled shutter and a detachable view finder casing mounted on the camera body, wherein the view finder casing includes at least a light measuring circuit for the electronic shutter including a light receiving element for detecting the luminosity of a subject before exposure and a circuit for connecting the output of the light measuring circuit to a storage means. The camera body includes a circuit for connecting the electronic shutter to a power source and a control circuit for controlling the operation of the electronic shutter. The circuit in either the view finder casing or the camera body has a flexible printed circuit with a bent member at one end thereof while the circuit in the other of the view finder casing or the camera body is provided with a contact member for contacting engagement with the bent member of the flexible print circuit when the view finder casing is being mounted correctly in position on the camera body, thereby forming a complete electronic shutter control circuit.

In the present invention, when the view finder casing is mounted in position on the camera body, a power source in the form of a battery is connected through the contact member and the flexible printed circuit to the light measuring circuit which is provided in the view finder casing and which includes a light receiving element for producing electric current corresponding to the luminosity of light rays incident on the light receiving element from the photographing view field through the objective lens. That current is transmitted to and stored in the storage circuit which is connected to the light measuring circuit within the view finder casing. The connection between the light measuring circuit and the storage means is broken with the shutter releasing operation and the stored voltage in the storage means is supplied to the timing circuit in the camera body through the flexible printed circuit and the contact member previously mentioned, thereby controlling the electronic shutter by means of the control circuit on the camera body which consists of the timing circuit and a switching circuit.

The above and other objects, features and advantages of the present invention will become apparent from the following description when taken in conjunction with the accompanying drawings.

DETAILED DESCRIPTION OF THE INVENTION

Figure 1:
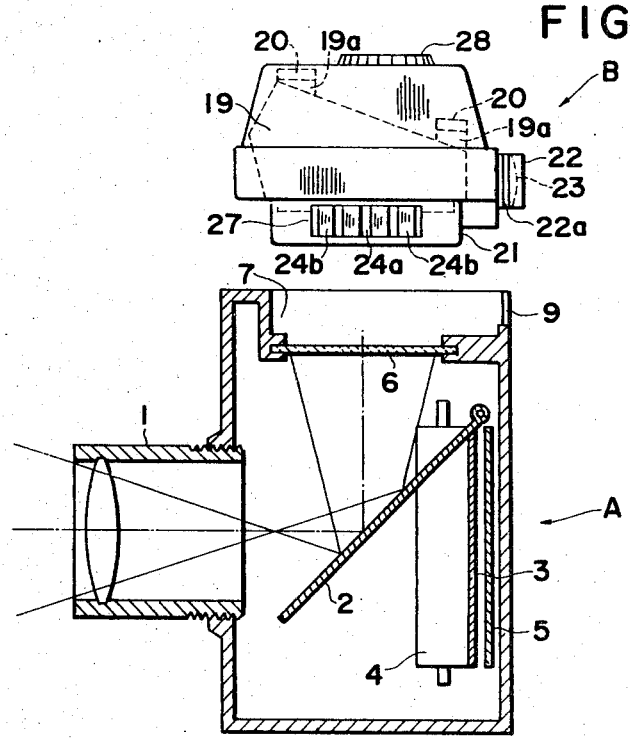
FIG. 1 is a view of the essential parts of the camera construction in one preferred embodiment of the present invention, showing the camera body in vertical cross-section and the view finder casing in side elevation.
Figure 2:
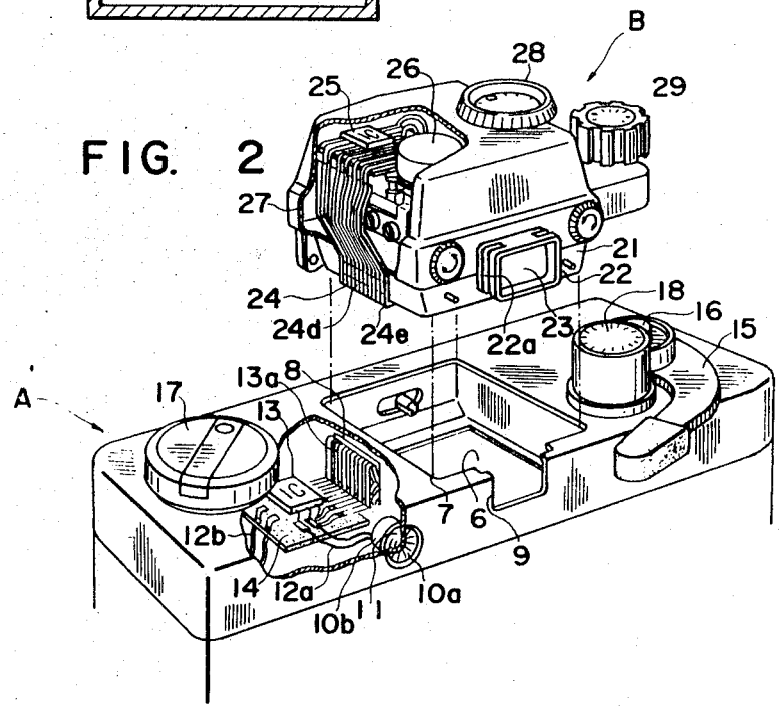
FIG. 2 is a partially sectioned perspective view of the embodiment shown in FIG. 1.

Referring to FIGS. 1 and 2, the camera body A comprises an objective lens assembly 1 and a focal plane shutter 4 including a curtain 3 which is driven in front of a film plane 5. The light rays which have been transmitted through objective lens 1 from a photographing view field are reflected onto focusing plate 6 by means of movable mirror 2 which is held in a viewing position, in the manner well known in the art. When view finder casing B is not mounted in position on the camera body A, focusing plate 6 may be observed from above directly. When view finder casing B is mounted on camera body A, the light rays scattering from focusing plate 6 are transmitted through a condenser lens, not shown, and introduced into pentagonal prism 19 accommodated within view finder casing B to allow observation through eyepiece 23. In this instance, a portion of the light rays which have been introduced into the view finder is projected through prism 19a onto light receiving element 20 which is disposed on the roof or upper surface of pentagonal prism 19.

Camera body A has formed in the center portion of the upper surface thereof recess 7 for fitting engagement with view finder casing B. Recess 7 is provided with an opening in the side wall thereof and with notch 9 in the rear wall for fitting engagement with eyepiece 22 which is rearwardly projected from view finder casing B. Camera body A is further provided with chamber or compartment 10b for accommodating battery 11 which is employed as a power source. Battery chamber 10b is covered with detachable lid member 10a.

Mounted on camera body A is integrated shutter speed controlling circuit 13 which comprises a timing circuit and a switching circuit. Shutter speed controlling circuit 13 is provided on printing base plate or substrate 14 which has lead 12a connected to battery 11, lead 12b for transmitting the output of the switching circuit to electronic shutter mechanism 4, and contact member 13a for supplying current from power source 11 to a circuit which is connected to the light measuring circuit and the storage means within the view finder casing and also for transmitting the voltage stored in the storage means to the timing circuit. Contact member 13a is projected into recess 7 through opening 8.

Camera body A has further mounted thereon lever 15 for winding up film 5 and cocking shutter 4, release button 16, film rewinding lever 17, and shutter speed setting dial 18 for manually presetting the shutter speed.

View finder casing B has formed in the lower portion thereof a lower extension for fitting engagement with recessed portion 7 on camera body A, and in the rear portion with eyepiece frame 22 for supporting eye lens 23.

The view finder casing has mounted therein integrated circuit 25 which includes a light measuring circuit to produce a voltage in proportion to a logarithmic value of the light luminosity received by light receiving element 20 and a circuit which includes a storage means to which the output of the light measuring circuit is fed before the exposure. The output of integrated circuit 25 is fed to meter 26 and flexible printed circuit 24.

Figure 4:
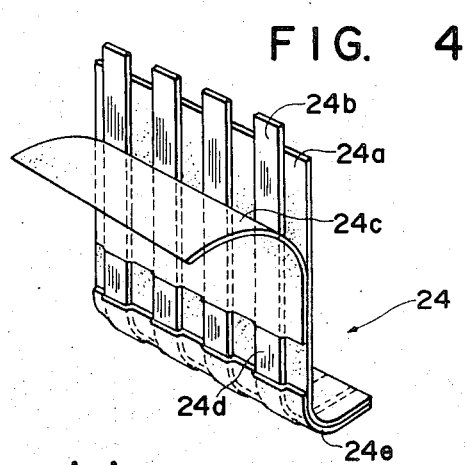
FIG. 4 is a perspective view showing on an enlarged scale a preferred form of the flexible printed circuit employed in the embodiment shown in FIG. 1.

Flexible printed circuit 24 is formed, as shown in FIG. 4, by printing conducting circuit 24b on flexible insulating film 24a. Generally, the surface of the flexible printed circuit is laminated with insulating film 24c of the same nature as the insulating film 24a. Conducting circuit 24b thus being sandwiched between two insulating films 24a and 24c. A portion of insulating film 24c is removed to provide contact portion 24d in, or adjacent to, bent portion 24e to ensure optimum contact with contact member 13a of the control circuit on camera body A. Contact portion 24d is located within opening 27 which is formed in the side wall of lower extension 21 of view finder casing B.

Figure 3:
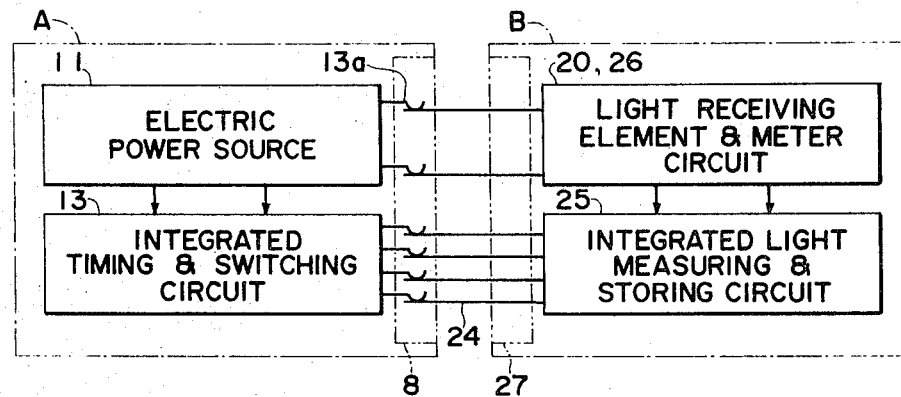
FIG. 3 is a diagram of a shutter control circuit employed in the embodiment shown in FIG. 1.

Thus, when view finder casing B is mounted correctly in position on camera body A, contacting member 13a, which projects into recessed portion 7 through opening 8, is resiliently brought into contacting engagement with contacting portion 24d of flexible printed circuit 24 which is disposed in opening 27 of view finder casing B, as shown in FIG. 3, thus forming a complete exposure control circuit for the electronic shutter.

As shown in FIG. 2, view finder casing B has mounted thereon film sensitivity selector dial 28 and shutter speed selector dial 29 for manual setting operation. When view finder casing B is mounted in position on the camera body, shutter speed setting dial 29 on view finder casing B is mechanically connected to shutter speed setting dial 28 on the camera body for rotation therewith.

Figure 5A:
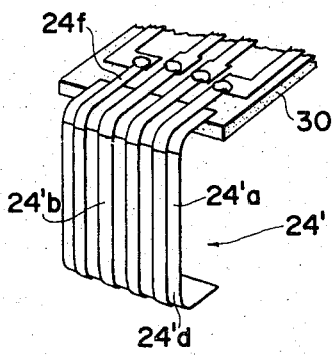
FIGS. 5a and 5b are fragmentary perspective views showing modified structures of the flexible printed circuit.

In the modified flexible printed circuit arrangement 24' shown in FIG. 5a, contact portion 24'd is, in addition to being used for connection with the contact member on the camera body, extended at one end thereof as shown at 24'f to form a lead for connection with the circuit printed on base plate 30.

Figure 5B:
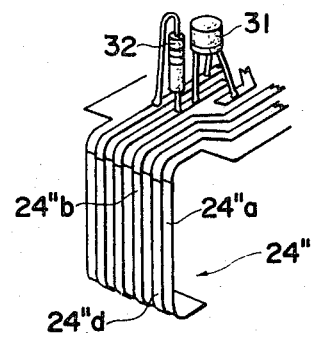

FIG. 5b shows another modification wherein flexible printed circuit 24'' per se is used as a base plate and the electric elements such as transistor 31 and capacitor 32 are directly connected to printed conducting circuit 24''b.

In the embodiment shown in FIG. 2, flexible printed circuit 24 is provided on the side of integrated circuit 25 in view finder casing B for connection with contact member 13a on camera body A. However, it will be understood that it is possible to provide contact member 13a on the side of integrated circuit 25 in view finder casing B and flexible printed circuit 24 on the side of integrated circuit 13 on camera body A.

While a specific embodiment of an electronic shutter camera construction has been disclosed in the foregoing description, it will be understood that various modifications within the spirit of the invention may occur to those skilled in the art. Therefore, it is intended that no limitation be placed on the invention except as defined by the scope of the appended claims.

What is claimed is:

1. A photographic camera comprising:
   a camera body with an electronic shutter and a view finder casing detachably mounted on the camera body;
   said view finder casing including at least a light measuring circuit including a light receiving element for receiving light rays which are introduced into an optical system of the view finder from a photographic view field;
   said camera body having mounted thereon a circuit connected to a power source in the form of a battery, a timing circuit operative in response to an input voltage, and a switching circuit operative to terminate the exposure by the electronic shutter;
   a flexible printed circuit with a bent portion at one end thereof and with a contact portion adjacent said bent portion, said flexible printed circuit being mounted on one of said camera body and said view finder casing; and
   the other of said view finder casing and said camera body having connected to the circuit thereof a contact member for contacting engagement with said contact portion of said flexible printed circuit when said view finder casing is mounted in position on said camera body, thereby establishing connection between said power source and said light measuring circuit.

2. A photographic camera as in claim 1, wherein said camera is of a single lens reflex type which comprises an objective lens, a focusing plate and a reflecting mirror movable between a viewing position and a picture taking position for reflecting light rays incoming through said objective lens onto said focusing plate when in said viewing position, a portion of light rays transmitted from said focusing plate being projected onto said light receiving element.

3. A photographic camera as in claim 1, wherein said view finder casing further comprises a meter and a circuit providing connection between said meter and said light measuring circuit.

4. A photographic camera as in claim 1, further comprising a storing circuit in said viewfinder casing and associated with said light measuring circuit for storing a voltage received therefrom; and wherein said light measuring circuit and said storing circuit in said view finder casing are formed into a single integrated circuit and said timing circuit and switching circuit in said camera body are formed into a single integrated circuit and said contact member in contact with said contact portion feeds said stored voltage to said timing circuit.

5. A photographic camera as in claim 1, further comprising a recess formed in the upper surface of said camera body and having at least one side wall;
a first opening formed in the side wall of said recess for passing said contact member therethrough;
an extension, having at least one side wall, formed at the bottom of said view finder casing for engagement within said recess on said camera body;
said contact portion of said flexible printed circuit is located in said side wall of said extension for connection with said contact member when said view finder casing is mounted in fitting engagement with said recess on the camera body.

6. A photographic camera as in claim 5, wherein said flexible printed circuit is formed from a thin flexible insulating film, a conducting circuit printed on said insulating film, and another thin flexible insulating film covering said conducting circuit leaving said contact portion uncovered.

* * * * *